United States Patent [19]
Guerin

[11] Patent Number: 5,643,993
[45] Date of Patent: Jul. 1, 1997

[54] AQUEOUS POLYMER DISPERSION, METHOD FOR MAKING SAME, AND USE THEREOF FOR PREPARING PAINTS

[75] Inventor: Patrick Guerin, Meerbusch Strümp, Germany

[73] Assignee: Cray Valley, S.A., France

[21] Appl. No.: 640,729

[22] PCT Filed: Nov. 7, 1994

[86] PCT No.: PCT/FR94/01294

§ 371 Date: Jul. 2, 1996

§ 102(e) Date: Jul. 2, 1996

[87] PCT Pub. No.: WO95/13309

PCT Pub. Date: May 18, 1995

[30] Foreign Application Priority Data

Nov. 10, 1993 [DE] Germany ............... 93 13552

[51] Int. Cl.[6] ........................................... C08L 31/04
[52] U.S. Cl. ........................................... 524/524
[58] Field of Search ............................... 524/524

[56] References Cited

U.S. PATENT DOCUMENTS

| | | | |
|---|---|---|---|
| 4,107,120 | 8/1978 | Plamondon et al. | 260/29.6 RB |
| 4,868,016 | 9/1989 | Lorah et al. | 427/287 |
| 5,185,387 | 2/1993 | Klesse et al. | 523/201 |

FOREIGN PATENT DOCUMENTS

| | | | |
|---|---|---|---|
| 151 360 B1 | 6/1989 | European Pat. Off. | C08F 265/06 |
| 429 207 A1 | 5/1991 | European Pat. Off. | C08F 265/06 |
| 522 789 A2 | 1/1993 | European Pat. Off. | C09D 151/06 |

OTHER PUBLICATIONS

Daniel, J.C., Makromol. Chem. Suppl. 10/11, pp. 359–90 (1985) (English abstract only).

Okubo, M., et al., *Production of Anomalously Shaped Carboxylated Polymer Particles by Seeded Emulsion Polymerization*, Colloid and Polymer Science, 265: 876–881 (1987).

*Primary Examiner*—Edward J. Cain
*Attorney, Agent, or Firm*—Whyte Hirschboeck Dudek S.C.

[57] ABSTRACT

Aqueous dispersion of polymer particles comprising at least one first polymer and at least one second polymer which are mutually incompatible. The first polymer is non-crosslinked, has a glass transition temperature of from −25° to 0° C. and represents from 40 to 65% by weight of the particles; the second polymer is not alkali-soluble and is non-crosslinked, has a glass transition temperature of from 5° to 40° C. and represents from 60% to 35% by weight of the particles; the glass transition temperature of the second polymer exceeds that of the first polymer by less than 40° C. and the average particle size is between 100 and 300 nm.

Application to the production of environmentally compatible paints.

20 Claims, No Drawings

AQUEOUS POLYMER DISPERSION, METHOD FOR MAKING SAME, AND USE THEREOF FOR PREPARING PAINTS

The present invention relates to an aqueous polymer dispersion containing structured particles, which is intended in particular for the production of solvent-less paints, to a process for its production, and to its application to solvent-less paint formulations.

Latex-based paint compositions containing opacifying pigments, such as titanium dioxide, and non-opacifying pigments have been known for a long time. When an aqueous polymer emulsion is applied to a substrate, and after the water has evaporated, a film appears on the surface of the said substrate owing to the coalescence of the polymer which is present in the emulsion.

In order to obtain a homogeneous film, the forces of coalescence must exceed the resistance of the polymer particles to deformation and to viscoelasticity. The viscoelastic nature of the polymer particles, consequently, is the major factor determining the tendency of the latex to form a film.

It is established art to use a plasticizer in order to modify the viscoelasticity of a polymer latex. The plasticizers may be solids with a low melting point (for example dibutyl or dioctyl phthalate) or else solvents having a high boiling point. In a general manner, they increase the elongation and the elasticity but reduce the breaking strength of the resin in which they are incorporated. Despite being less volatile than the solvents, they are nevertheless in possession of a characteristic odour.

It is also known to use solvents (of the glycol type, for example), sometimes called coalescence agents, in order to modify the viscoelastic nature of the polymer. These are volatile plasticizers in that they facilitate the elastic deformation of the particles of the latex.

The result of using plasticizers and coalescence agents in latex films is a greater degree of coalescence within an extended temperature range, and up until now it has been thought that their presence was essential to good film formation.

Moreover, it is known to classify paints according to their gloss, measuredly reflection of light at a given angle, for example in accordance with the standard DIN 53778 (Part 1), into:
  matt paints: reflection greater than 7% but less than 45% at an angle of 85°.
  semi-matt paints: reflection greater than 45% at an angle of 85°.
  semi-gloss paints: reflection greater than 31% but less than 62% at an angle of 60°.

The properties expected of a paint are good applicability, good binding power, the absence of cracks even at low temperature (5° C.), the absence of a tacky or sticky nature, good resistance to wet abrasion (washability) and, finally, a degree of reflection of light which is suited to one or other of the above categories. According to which one of these categories it belongs to, the pigment volume concentration of the paint is very different: from 70% to 95%, approximately, for a matt paint, and only from 20% to 40%, approximately, for a semi-gloss paint. Likewise, washability is a property which is easily obtained in semi-matt and semi-gloss paints because of the high proportion of latex in the latter. In contrast, in matt paints which usually contain only from 10% to 15%, approximately, by weight of latex polymer, satisfactory washability can only be obtained by careful selection of the nature of the latex polymer.

Moreover, it is well known that the paint industry causes a certain number of problems with regard to ecology and to respect for the environment, which result from the chemical composition of the paint and, in particular, from the presence in this composition of volatile organic substances such as the coalescence agents.

These problems are, in particular, those brought about by the toxicity of these organic substances when the paint is produced and applied, and by the destruction of the ozone layer of the atmosphere when these substances evaporate during application.

Aqueous polymer dispersions comprising non-homogeneous or structured particles obtained, in general, by the technique of overpolymerization, carried out in at least two polymerization steps, are well known. Examples of such structured particles, of varied morphology, have been described by J. C. Daniel in Macromol. Chem., Suppl 10/11, pages 359 to 390 (1985) and are designated, in particular, using the terms core-shell, mutlilayer, cellular, Poow or else particles with a composition gradient. Other examples of structured particles, having an "octopus ocellatus" [ocellated octopus] morphology, have been described by M. Okubo, K. Kanaida and Matsumoto in Colloid and POlymer Science, Vol. 265 No. 10 (1987), pages 876 to 881.

Thus patent U.S. Pat. No. 4,107,120 describes an emulsion of acrylic polymer particles which have a core-shell structure in which the core is crosslinked, has a glass transition temperature of less than $-20°$ C. and represents from 30% to 60%, approximately, by weight of the particle, and in which the shell, which is likewise crosslinked, has a glass transition temperature of from $-10°$ to $+60°$ C., approximately. Patent EP-B-151,360 describes an aqueous dispersion of polymer particles consisting of a copolymer of (A) from 95% to 99% by weight of at least one alkyl (meth)acrylate in which the alkyl group has 1 to 8 carbon atoms, and (B) from 1 to 5% by weight of at least one water-soluble monomer which is copolymerizable with the monomer(s) (A), the said particles having a composite structure comprising a core and a shell, and the dispersion being characterized in that the shell contains from 50 to 90 mol% of the water-soluble monomer(s) of the dispersion and in that the said dispersion can be obtained by a process comprising a first step of emulsion polymerization, in water, of the monomer(s) (A) and a second step consisting in introducing into the reactor, when the degree of progress of the polymerization reaction has reached a value of at least 82%, a mixture comprising from 12 to 45% by weight of at least one water-soluble monomer (B) and from 55 to 88% by weight of monomers (A).

U.S. Pat. No. 5,185,387 describes an aqueous synthetic-resin dispersion which has a film formation temperature of less than 50° C. and contains an emulsion of a polymer of composite structure comprising a core and a shell consisting of:
  A) From 65 to 90% by weight of a polymer (core) having a low degree of crosslinking and a glass transition temperature of less than 0° C. and an elongation break of at least 150%, the said core comprising:
    1) at least one (mono) ethylenically unsaturated monomer which is polymerizable by free radicals and whose homopolymer has a glass transition temperature of less than 25° C., and
    2) from 0.1 to 2.0% by weight of the said core, of at least one crosslinking monomer containing at least two ethylenically unsaturated, non-conjugated groups which are polymerizable by free radicals, and
  B) from 10 to 35% by weight of a polymer (shell) which is essentially non-crosslinked and has a glass transition temperature of less than 60° C., comprising:

1) at least one ethylenically unsaturated monomer which is polymerizable by free radicals and whose homopolymer has a glass transition temperature of less than 25° C., and
2) at least one monoethylenically unsaturated monomer which is polymerizable by free radicals and whose homopolymer has a glass transition temperature of greater than 25° C., the glass transition temperature of the core being less than that of the shell by at least 10° C., and the shell containing up to 20% by weight of monomers chosen from acrylic acid, methacrylic acid and hydroxyalkyl esters thereof, acrylamide, methacrylamide and N-alkylated derivatives thereof.

Patent application EP-A-522,789 describes a polymer binder in emulsion which comprises at least one first polymer and at least one second polymer which are mutually incompatible, in which the first polymer has a glass transition temperature of from −30° to −60° C., approximately, and represents from 70% to 95%, approximately, by weight of the binder and in which the second polymer has a glass transition temperature of from 0 to 60° C., approximately. The glass transition temperature of the second polymer (shell) is preferably greater than that of the first polymer (core) by at least approximately 40° C.

U.S. Pat. No. 4,868,016 describes a composition which is formed by combining at least one thermoplastic polymer latex which is substantially insoluble in an aqueous-alkaline medium with at least one alkali-soluble polymer which is incompatible with the said thermoplastic polymer latex, in a ratio by weight of the thermoplastic latex to the alkali-soluble polymer which is between approximately 20:80 and approximately 99:1. The thermoplastic latex preferably possesses a glass transition temperature of less than −10° C. and the alkali-soluble polymer possesses a glass transition temperature which is greater than 30° C. The alkali-soluble polymer preferably comprises from 10% to 60% by weight of an acidic monomer (such as (meth)acrylic acid), while the thermoplastic latex preferably comprises less than 3% by weight of an acidic monomer of this kind. The composition described by this document is useful as an adhesive, since it becomes sticky to the touch when its temperature is raised.

The document EP-A-429,207 describes, primarily for the coating of wood, glass, plastics and aluminium, a composition which comprises an aqueous dispersion of particles comprising at least two mutually incompatible copolymers, forming an outer phase and an inner phase, whose average size is from 20 to 70 nm. Crosslinking monomers may be present. The Tg of the outer phase is preferably lower than that of the inner phase, the one being preferably lower than 35° C. and the other preferably greater than 45° C., approximately.

However, up to now there has been no aqueous polymer dispersion—of which the documents above illustrate some examples—which has made it possible to do without coalescence agents in such a way as to solve the environmental problems described previously.

The aim of the present invention is to attain a number of objectives, and in particular to solve the ecological problems described above by totally eliminating the coalescence agents from the composition of the aqueous paints. Secondly, it aims to attain the first objective without detriment to the totality of properties demanded of the paint. It also aims to define a polymer binder which is adapted to matt, satin and semi-gloss paints, whilst obtaining, especially for matt paints (which contain little binder) an improved degree of washability.

In order to attain these various objectives, a first subject of the present invention consists of an aqueous dispersion of polymer particles comprising at least one first polymer and at least one second polymer which are mutually incompatible, characterized in that the first polymer is non-crosslinked, has a glass transition temperature of from −25° to 0° C., approximately, and represents from 40 to 65%, approximately, by weight of the particles, the second polymer is not alkali-soluble and is non-crosslinked, has a glass transition temperature of from +5° to 40° C., approximately, and represents from 60% to 35%, approximately, by weight of the particles, in that the glass transition temperature of the second polymer exceeds that of the first polymer by less than 40° C., and in that the average particle size is between 100 and 300 nm.

The two mutually incompatible polymers making up the aqueous dispersion according to the invention may consist of any morphological configuration of structured particles, such as those described by J. C. Daniel in Macromol. Chem., Suppl. 10/11, pages 359 to 390 (1985) and by M. Okubo, K. Kanaida and T. Matsumoto in Colloid and Polymer Science, Vol. 265 No. 10 (1987), pages 876 to 881, namely:

core-shell.

core-shell with multiple cores.

core-shell where the shell surrounds the core incompletely.

"octopus ocellatus".

The mutual incompatibility of the two polymers of the dispersion may be determined by any method which is known in the art, in particular by electron microscopy when the two polymers are of different types.

With regard to the second polymer, the term not alkali-soluble is understood as meaning insoluble in an aqueous-alkaline solution, which implies that the proportion of carboxylic acid monomer in this polymer does not exceed approximately 8% by weight.

The glass transition temperatures of the two polymers of the dispersion, which constitute characteristics which are very important for the efficacy of the present invention, may be calculated using the Fox equation (T. G. Fox, Bull. Am. Physics Soc., Vol. 1 (3), page 123 (1956)) and are in general measured by the method of programmed differential calorimetry.

Each of the two mutually incompatible polymers making up the aqueous dispersion according to the invention is prepared by polymerization of at least one ethylenically unsaturated monomer, observing a monomer composition which makes it possible to attain the desired glass transition temperature. Among the ethylenically unsaturated monomers which can be used it is possible to mention, on the one hand, esters of acrylic acid or methacrylic acid, such as methyl acrylate, ethyl acrylate, n-butyl acrylate, 2-ethylhexyl acrylate, methyl methacrylate and n-butyl methacrylate, and, on the other hand, aromatic vinyl monomers such as styrene and its derivatives, for example alpha-methyl styrene, vinyl toluene and tert-butyl styrene. The monomers forming the first polymer may be identical to or different from those forming the second polymer. Particular preference is given to using:

in order to form the core of the structured particle (first polymer), a mixture of from 15 to 35%, approximately, by weight of styrene or of methyl methacrylate and from 65 to 85%, approximately, by weight of n-butyl acrylate.

in order to form the shell of the structured particle (second polymer), a mixture of from 40 to 70%, approximately, by weight of styrene and from 30 to 60%, approximately, by weight of n-butyl acrylate.

Each polymer making up the aqueous dispersion according to the invention may additionally comprise, as an option, up to approximately 2 parts by weight of at least one water-soluble comonomer which is copolymerizable with the ethylenically unsaturated monomers, per 100 parts by weight of the said monomers. As water-soluble comonomers which can be used it is possible to mention, in particular, acrylic acid, methacrylic acid, acrylamide and methacrylamide. However, in contrast to the teaching of Patent EP-B-151,360, there is no need for this water-soluble comonomer to be incorporated selectively into the shell of the structured particle. It may simply be present in the core and in the shell in substantially identical proportions.

According to preferred embodiments of the present invention:

the glass transition temperature of the first polymer is between −25° and −5° C., approximately.

the glass transition temperature of the second polymer is between +15° and +35° C., approximately.

the glass transition temperature of the second polymer exceeds that of the first polymer by more than 20° C.

The methods of measuring and controlling the average particle size are well known to the person skilled in the art, for example by way of E. A. Collins, 18th Annual Short Course (June 1987) of the Institute of Polymer Emulsion, Lehigh University (Pennsylvania), by way of E. A. Collins, J. A. Davidson and C. A. Daniels, J. Paint Technology 47, 35 (1975) and via the operating principles of the AutoSizer Lo-C apparatus from Malvern Instruments.

As already set out in the general exposition of the present invention, it is essential for the two mutually incompatible polymers of the dispersion to be non-crosslinked. For this reason, no polyethylenically unsaturated monomer should be present in the compositions of monomers used to synthesize these polymers.

A second subject of the present invention consists of a process for the production of an aqueous dispersion, such as that according to the invention, comprising a first step of emulsion polymerization of monomers, leading to the formation of a first polymer, followed by a second step of emulsion polymerization of monomers, leading to the formation of a second polymer which is incompatible with the first, characterized in that:

the monomers used in the first step lead to the formation of a first, non-crosslinked polymer which has a glass transition temperature of from −25° C. to 0° C., approximately, the monomers used in the second step lead to the formation of a second, non-crosslinked polymer which is not alkali-soluble, having a glass transition temperature which is from +15° C. to 40° C., approximately, and exceeds the glass transition temperature of the first polymer by less than 40° C., the quantities of monomers employed in the first step and in the second step are such that the first polymer represents from 30% to 65%, approximately, by weight of the particles of dispersion, while the second polymer represents from 70% to 35%, approximately, by weight of the particles of the dispersion, and the emulsion polymerization conditions in the first step and in the second step are such that the average particle size is between 100 and 300 nm.

In order to lead to the formation of a first, non-crosslinked polymer and a second, non-crosslinked polymer, the flows of monomers used in the first step and, respectively, in the second step of the process according to the invention do not contain any monomer which is crosslinking as commonly designated in this art, that is to say no monomer which comprises at least two ethylenically unsaturated groups which are polymerizable by free radicals.

For the preparation of an aqueous dispersion which is suitable for the formulation of matt paints, as defined above, it is preferable furthermore that the addition and polymerization of the monomers in the second step commence when the composition of monomers of the first step has a degree of conversion of no more than 90%.

The nature of the monomers used in the first step and in the second step of the process according to the invention has already been set out above. As already indicated, it is possible to employ, in the first step and in the second step of the process, up to approximately two parts by weight of a water-soluble comonomer which is copolymerizable with the principal monomers per 100 parts by weight of the said monomers.

The process according to the invention can be carried out in the presence of up to approximately 1 part by weight, per 100 parts by weight of the monomers, of at least one chain transfer agent, in order to regulate the number-average molecular weight of the resulting polymer. As examples of compounds which can be used as chain transfer agents in the present invention, it is possible to mention mercaptocarboxylic acids having from 2 to 8 carbon atoms and their esters, such as mercaptoacetic acid, 2-mercaptopropionic and 3-mercaptopropionic acids, 2-mercaptobenzoic acid, mercaptosuccinic acid, mercaptoisophthalic acid and alkyl esters thereof. Preference will be given to using a mercaptomonocarboxylic acid and/or a mercaptodicarboxylic acid having from 2 to 6 carbon atoms, more particularly a mercaptopropionic acid and its alkyl esters, specifically the isooctyl or n-dodecyl esters of mercaptopropionic acid.

The principal flow of the ethylenically unsaturated monomers constituting each polymer of the dispersion may be emulsified by means of a least one anionic or nonionic surfactant, or may simply be introduced into the reactor in the form of a homogeneous mixture of monomers. In the latter case, an aqueous solution of one or more surfactants may be added simultaneously. It is preferable to use a combination of nonionic surfactant and anionic surfactant in order to prepare emulsions. As examples of nonionic surfactants it is possible to mention polyethers such as condensates of ethylene oxide and propylene oxide, alkyl and alkylaryl ethers and thioethers of polyethylene glycols and polypropylene glycols, alkylphenoxypoly(ethylenoxy) ethanols, polyoxyalkylene derivatives of partial esters of long-chain fatty acids such as lauric, myristic, palmitic and oleic acids, condensates of ethylene oxide with higher alkanethiols, ethylene oxide derivatives of long-chain carboxylic acids and of alcohols, etc. These nonionic surfactants preferably contain from approximately 5 to 100 units of ethylene oxide per molecule and, even more preferably, from approximately 20 to 50 of such units. As anionic surfactants which can be used, preferably in combination with the said nonionic surfactants, it is possible to mention sulphates and sulphonates of high molecular weight, for example alkyl, aryl and alkylaryl sulphates and alkyl-, aryl- and alkylarylsulphonates of sodium and potassium, such as sodium 2-ethylhexyl sulphate, potassium 2-ethylhexyl sulphate, sodium nonyl sulphate, sodium undecyl sulphate, sodium tridecyl sulphate, sodium pentadecyl sulphate, sodium lauryl sulphate, sodium methylbenzenesulphonate, potassium methylbenzenesulphonate, potassium toluenesulphonate and sodium xylenesulphonate, the sulphonated derivatives of the nonionic surfactants listed above, dialkyl esters of alkali metal salts of sulphosuccinic acid, such as sodium diamylsulphosuccinate, and condensation products of formaldehyde/naphthalenesulphonic acid. The total quantity of surfactants used in the emulsion polymerization process of the present invention varies from approximately 2 to 20 by weight, preferably approximately from 4 to 12% by weight, of the monomeric components. The ratio by weight of the anionic surfactant to the nonionic surfactant should be between 0.01 and 1 approximately, preferably between approximately 0.05 and 0.5. The quantity of water used in the reaction medium is, in general, determined by the solids content desired in the aqueous dispersion according to the invention, which is generally between approximately 40% and 70%, preferably between 45 and 60% by weight.

The monomeric components of the dispersion according to the invention are polymerized by means of effective quantities, preferably between 0.1 and 2%, approximately, by weight of the total charge of monomers, of at least one conventional free-radical initiator. Such an initiator is preferably substantially soluble in water. Such initiators comprise inorganic peroxides such as hydrogen peroxide, alkali metal perborates and persulphates, and redox systems such as combinations of an ammonium perchlorate, perborate or persulphate or of an alkali metal with an alkali metal bisulphite.

The polymerization temperature required to produce the aqueous polymers of the present invention in each of the two steps of the process is generally within a range from approximately 40° to 95° C. —preferably from approximately 55° to 85° C. —depending on the time envisaged for the polymerization. The polymerization time is generally from approximately 45 minutes to 6 hours for each of the two steps, this time becoming higher as the polymerization temperature decreases.

In order to attain a final degree of conversion in the polymerization reaction of 100%, it may be desirable to follow the second step by cooking of the aqueous polymer emulsion for approximately 30 to 90 minutes at a temperature which is higher, preferably by at least 8° C., than the polymerization temperature.

A complementary improvement of the present invention consists in the treatment of the aqueous polymer emulsion, after the second step or, if appropriate, after the cooking step, by means of a free-radical initiation system which has a short half-life at the temperature under consideration, in order to attain an overall degree of conversion which is close to 100% and/or a residual monomer content which does not exceed approximately 50 ppm. As examples of free-radical initiator systems it is possible to mention organic and inorganic peroxides such as tert-butyl hydroperoxide, butyl peroxide, hydrogen peroxide or alkali metal persulphates, in combination with a reducing agent such as sodium formaldehyde-sulphoxylate, ascorbic acid, Mohr's salt, etc. Such a treatment may be carried out at temperatures from 40° C. to 90° C., approximately, its duration depending on the chosen temperature and being preferably between 15 minutes and 3 hours, approximately.

When the latex prepared in conformity with the present invention appears too acid to enter into the formulation of paints, it may be desirable to adjust its pH to a value of greater than 7, for example by means of any alkaline substance such as the hydroxides of sodium, potassium or ammonium.

The first step of the process according to the invention may be seeded, that is to say initiated in the presence of a preformed emulsion of particles of small size, or else unseeded. Seeded polymerization is preferred and makes it possible to obtain polymer dispersions having particle sizes which are more uniform than with unseeded polymerization. More particularly, it has been discovered in accordance with the present invention that a very significant improvement in the washability of matt paint, as described above, may be obtained by carrying out seeding in the first step of the process such that approximately from 80 to 98% by weight of the monomers used in the first step are added to a reaction medium which already contains a partially polymerized pre-emulsion of approximately 2 to 20% by weight of the said monomers, and in that the average size of the polymer particles present in the said partially polymerized pre-emulsion does not exceed approximately 95 nanometers (nm), and preferably 65 nm. In addition to the methods of particle-size measurement already described previously, the person skilled in the art may also check that the average size of the polymer particles present in the partially polymerized pre-emulsion does not exceed 95 nm either by way of the polymerization time of the said partial flux (approximately from 5 to 20% by weight of the totality of the monomeric components) of the pre-emulsion, which should preferably not exceed approximately 45 minutes, or else by the overall degree of conversion of the monomers in the said partial flux of the pre-emulsion, which should reach at least 50% and preferably at least 90% by weight.

Another subject of the present invention consists of a paint which is free of plasticizer and of coalescence agent, comprising an aqueous polymer emulsion of the type described above.

The formulation method employed may be any one of those which are currently known in the art of formulating latex paints. Essentially, the aqueous paints according to the invention comprise a mixture of pigmented material and latex. The pigmentary material is preferably used in a form which has been suitably reduced to a powder by conventional means, and all of the other optional, solid adjuvants described below.

To combine the paint ingredients so as to formulate the latex paint of the present invention, one or more primary pigments and, if appropriate, other adjuvants (which may themselves be liquid or solid) may be incorporated into the latex binder in order to form a uniform mixture, simply by adding all of the raw materials to a stirred vessel. Although it is possible to combine the pigments and other ingredients with the emulsion and to grind or crush the mixture in a grinder-disperser, it is desirable first to prepare an aqueous paste of the pigment and adjuvants, preferably with the aid of a dispersant, in an apparatus having a high shear gradient, and then to combine the resulting paste with the latex. The consistency of the paste may be controlled by the respective quantities of water, pigments and adjuvants which are used.

To formulate the aqueous paints of the present invention it is possible to use:
  filler materials which are present in pulverulent form, such as calcium carbonate, dolomite, talc, mica, barium sulphate, lime, cement, and any filler materials conventionally used in paints.
  pigmentary materials such as titanium oxide, carbon black, copper phthalate cyanine, zinc oxide, iron oxides, chromium oxide and any other pigmentary material which is conventionally employed in paints.

The proportion of pigmentary material which is used to formulate an aqueous paint according to the present invention is determined by a certain number of factors including the depth of colour desired, the hiding power, etc. In general, the aqueous paints of the present invention possess pigment volume concentrations within a range from approximately 20% to 95% according to the category of paint in question; for example, from approximately 70 to 95% for matt paints and from approximately 20 to 40% for semi-gloss paints.

In addition to the pigments and fillers, one or more adjuvants may if desired be included in the formulation of the aqueous paints of the present invention. Such ingredients include (but are not limited to):

- dispersants, also called deflocculants, that is to say compounds which are capable of promoting the formation of electrical charges of the same sign at the surface of the polymer particles and, consequently, of promoting the creation of repellent electrical forces between these particles, such as alkali metal silicates (especially metasilicates), alkali metal polyphosphates and alkali metal salts of organic polyacids (especially polyacrylates);
- wetting agents, that is to say compounds capable of modifying the surface tension of the medium, generally comprising groups of hydrophilic and hydrophobic nature. They may include anionic surfactants (for example alkali metal alkylarylsulphonates), cationic surfactants (for example quaternary ammonium salts) or nonionic surfactants (for example polyether oxides);
- rheology modifiers or thickeners, such as water-soluble polymers modified by hydrophobic groups (for example urethane ethoxylate modified hydrophobically) and hydroxyalkylcellulose derivatives;
- inorganic bases, that is to say, for example, ammonia, sodium hydroxide or potassium hydroxide;
- antifoam agents such as a mixture of mineral oil and nonionic emulsifier;
- biocides, that is to say compounds which are capable of destroying microorganisms, such as isothiazolone or chloroallyl derivatives;
- anticorrosive agents, such as an aqueous solution of sodium benzoate and/or of sodium nitrite;
- insecticides, fungicides, acaricides and other pesticides, such as pyrethrinoid compounds (for example decamethrin or dieldrin), lindane, N-heterocyclic compounds, uracyclic compounds, triazole derivatives, organophosphorus compounds, etc.

The choice of the particular adjuvants and their respective quantities is generally dictated by the properties desired for a particular aqueous paint, and is within the scope of the person skilled in the art. In general, however, the latex paints of the present invention have an overall solids content of between approximately 40 and 70% by weight.

The aqueous paints of the present invention may be applied to the surface of a wall or to any other substrate by any conventional means, for example brush, roller, spray-gun, etc. The paint may be crosslinked or dried after application to the substrate, likewise by conventional means, for example drying in air, baking, etc. The coat of paint, crosslinked or otherwise, has excellent performance characteristics as regards resistance to yellowing, absence of cracking at low temperature and of any tacky or sticky nature, and coalescence at low temperature. Moreover, the surfaces coated using the latex paints according to the present invention have good characteristics with regard to the contrast ratio (that is to say the hiding power).

These properties are illustrated more fully in the examples which follow, which are given with the aim of illustrating— but not limiting—the present invention. All of the quantities without exception are expressed in terms of weight.

EXAMPLES 1 to 6

A first emulsion is prepared at room temperature (23° C.) by adding the following ingredients to a vessel equipped with a stirrer, in the following order:

| | |
|---|---|
| Demineralized water | 32 parts |
| Anionic surfactant marketed by Schering under the tradename Rewopol NOS 25 (35% active ingredient) | 0.75 part |
| Nonionic surfactant marketed by Schering under the tradename Rewopol HV 25 (80% active ingredient) | 3.6 parts |
| Acrylamide | 0.2 part |
| Acrylic acid | 1 part |
| n-Butyl acrylate | x parts |
| Styrene | y parts |
| n-Dodecanethiol | 0.02 part |

The reactor is charged with 5% by weight of the first emulsion, 38 parts of demineralized water and 0.3 part of Rewopol NOS 25. The reactor is then heated to 72° C. and then maintained at this temperature. A solution of metabisulphite (0.1 part of sodium metabisulphite in 0.5 part of demineralized water) and an initiator solution (0.035 part of ammonium persulphate in 0.5 part of deminizeralized water) are then added to the reactor. Polymerization is then carried out for 15 minutes. The reactor is maintained at a temperature of 72° C. and the remaining 95% by weight of the first emulsion and an initiator solution (0.315 part of ammonium persulphate in 10 parts of demineralized water) are added to the seed batch thus obtained, simultaneously and progressively over an additional period of 2 hours.

During this first polymerization step, a second emulsion is also prepared at room temperature (23° C.) by adding the following ingredients to a vessel equipped with a stirrer, in the following order:

| | |
|---|---|
| Demineralized water | 20 parts |
| Rewopol HV 25 | 2.8 parts |
| Acrylamide | 0.3 part |
| Acrylic acid | 1.5 part |
| n-Butyl acrylate | w parts |
| Styrene | z parts |
| n-Dodecanethiol | 0.1 part |

At the end of the first step of polymerization, the second emulsion—on the one hand—and, on the other hand, an initiator solution (0.315 part of ammonium persulphate in 10 parts of demineralized water) are added to the reactor. This addition lasts 90 minutes, after which the temperature is maintained at 72° C. for 15 minutes more, and then cooking is carried out at 80° C. for 1 hour. The latex is subsequently cooled to 60° C. and then treated by adding to it:

firstly, a solution of 0.315 part of hydrogen peroxide (100% active ingredient) in 2.3 parts of demineralized water, then a solution of 0.015 part of Mohr's salt and 0.315 part of ascorbic acid in 1.7 parts of demineralized water, which is added over the course of an hour.

The latex is then cooled to 30° C. before a 10% aqueous solution of sodium hydroxide is added to it over the course of an hour.

By varying, on the one hand, the values of x, y, w and z and, on the other hand, the degree of conversion $\tau$ (expressed as % by weight) of the monomers at the end of the first step, different latexes are obtained, for which the following characteristics are indicated in Table I:

solids content SC, expressed as a percentage.

average particle size APS, determined using an AutoSizer Lo-C apparatus from Malvern Instruments and expressed in nanometers.

Brookfield viscosity BV at 100 revolutions/minute, expressed in Pa.s.

residual monomer content RMC, expressed in ppm.

minimum film formation temperature MFT, expressed in °C.

pH.

glass transition temperatures of the core, Tg1, and of the shell, Tg2, expressed in °C. and determined by programmed differential calorimetry.

TABLE I

| Example | 1 | 2 | 3 | 4 | 5 | 6 |
|---|---|---|---|---|---|---|
| τ | 83 | 83 | 83 | 89 | 95 | 99 |
| x | 25.8 | 37 | 40.8 | 37 | 37 | 37 |
| y | 8.2 | 11.8 | 13 | 11.8 | 11.8 | 11.8 |
| w | 21 | 16.7 | 15 | 16.7 | 16.7 | 16.7 |
| z | 42 | 31.5 | 28.2 | 31.5 | 31.5 | 31.5 |
| SC | 49.1 | 48.7 | 48.8 | 48 | 48.2 | 48.9 |
| APS | 122 | 116 | 125 | 116 | 117 | 120 |
| BV | 0.25 | 0.3 | 0.35 | 0.27 | 0.3 | 0.31 |
| RMC | 30 | 20 | 26 | 20 | 32 | 26 |
| MFT | 0 | 0 | 0 | 0 | 0 | 0 |
| pH | 8.5 | 8.7 | 8.5 | 8.5 | 8.7 | 8.5 |
| Tg1 | −12 | −12 | −12 | −11 | −12 | −12 |
| Tg2 | 22 | 22 | 21 | 24 | 28 | 33 |

Example 1 is comparative

EXAMPLES 7 to 12

Some aqueous polymer dispersions from the preceding examples were formulated into matt paint compositions, comprising:

| water | 270 parts |
|---|---|
| wetting agent marketed by Benkiser under the tradename Lopon 890 | 3 parts |
| biocide marketed Riedel-DeHäen under the tradename Mergal K 10 | 1 part |
| wetting agent and dispersant marketed by Munzing under the tradename Agitan 281 | 2 parts |
| thickener (rheology modifier) marketed by Hoechst under the tradename MHB 6000 Y | 4.5 parts |
| titanium oxide marketed by Sachtleben under the tradename Hombitan R 611 | 50 parts |
| calcium carbonate marketed by Deutsche Solvay under the tradename Socal P 2 | 160 parts |
| chalk (industrial grade) | 250 parts |
| calcium carbonate marketed by Omya under the tradename Calcidar BL | 110 parts |
| silica marketed by Langer under the tradename Dicalita WP 5 | 10 parts |
| 25% aqueous sodium hydroxide solution | 2 parts |
| aqueous polymer emulsion | 117.6 parts |

The washability of these paints was measured after 8 days in accordance with the standard DIN 53778 Part 2. Table II indicates the values for washability, expressed in cycles, as a function of the nature of the aqueous polymer emulsion employed.

TABLE II

| Example | 7 | 8 | 9 | 10 | 11 | 12 |
|---|---|---|---|---|---|---|
| Aqueous polymer from Example | 1 | 2 | 3 | 4 | 5 | 6 |
| W | 200 | 800 | 760 | 510 | 300 | 260 |

Examples 7, 11 and 12, of mediocre washability, are given by way of comparison.

Moreover, the aptitude of these paints in the formation of a film at 5° C. was evaluated in the following way: the paint formulation is applied while still in the wet state to a glass plate in a thickness of 300 μm. The plate is then stored at 5° C. at a relative humidity of 70% for 18 hours, so that the formation of the film of paint takes place under extreme service conditions. One hour after return to room temperature (20° C.), visual observation is carried out of the presence or otherwise of cracks.

The paints of Examples 8 to 10 have a good aptitude for film formation at 5° C., as characterized by the absence of cracks.

EXAMPLES 13 to 15

The aqueous polymer dispersions of Examples 1 to 6 were formulated into semi-matt paint compositions, comprising:

| water | 150 parts |
|---|---|
| dispersant marketed by Hoechst under the tradename Dispex N 40 | 3 parts |
| wetting agent and dispersant marketed by Munzing under the tradename Agitan 281 | 3 parts |
| biocide marketed by Riedel-De Häen under the tradename Mergal K 10 | 1 part |
| thickener marketed by Aqualon under the tradename Culminal HEC 30000 | 3 parts |
| titanium dioxide marketed by Kronos under the name Kronos 2063 | 200 parts |
| calcium carbonate marketed by Omya under the tradename Hydrocarb | 175 parts |
| neutralizing agent (25% aqueous sodium hydroxide solution) | 1 part |
| aqueous polymer emulsion | 350 parts |

The reflection of light for these paints is determined in accordance with the standard DIN 53778 (Part 1) at two different angles: 20° ($R_{20}$) and 60° ($R_{60}$). The corresponding values, expressed as a percentage, are indicated in Table III as a function of the nature of the aqueous polymer emulsion employed.

TABLE III

| Example | 13 | 14 | 15 |
|---|---|---|---|
| Aqueous polymer emulsion of Example | 2 | 3 | 4 |
| $R_{20}$ | 1.4 | 1.0 | 2.0 |
| $R_{60}$ | 8.8 | 9.2 | 9.4 |

In addition, the aptitude of these paints for film formation at 5° C. was evaluated in accordance with the same method as for Examples 7 to 12. This aptitude is good, as characterized by the absence of cracks.

Finally, the superficial tack is evaluated by the separation capacity of two films of paint in the wet state (of format 25×25 mm and of thickness 300 μm) placed in contact, after drying for 24 hours at 23° C. at a relative humidity of 50%, for 8 hours under a load of 1 kg.

For each of Examples 13 to 15, a complete absence of blocking between the two test specimens is observed.

EXAMPLE 16

The aqueous polymer dispersion of Example 2 is formulated into a semi-gloss paint composition, comprising:

| | |
|---|---|
| water | 150 parts |
| wetting agent and dispersant marketed by Coatex under the name P 90 | 2 parts |
| thickener marketed by Aqualon under the name Natrosol 250 HR | 5 parts |
| 20% aqueous solution of sodium benzoate | 10 parts |
| 25% aqueous solution of sodium hydroxide as neutralizing agent | 2 parts |
| titanium dioxide marketed by Tioxide under the name TR 92 | 250 parts |
| thickener marketed by Coatex under the name Coapur 5035 | 16 parts |
| aqueous polymer emulsion | 540 parts |

The aptitude of this paint for film formation at 5° C., and its surface tack, were evaluated in accordance with the methods described in the preceding examples and were found to be satisfactory, namely:

absence of cracking on film formation at 5° C.

total absence of blocking between the two test specimens.

The reflection of light for this paint is determined in accordance with the standard DIN 53778 (Part 1) and is found to be:

44.1% at an angle of 60°.

85% at an angle of .85°.

EXAMPLES 17 and 18

Emulsions are prepared in accordance with the process described for Examples 1 to 6, except for the fact that the styrene is replaced by methyl methacrylate in both the first step and the second step. Example 18 is comparative. Depending on the values of x, y, w, z and τ, latexes are obtained for which the characteristics, expressed and determined as for Examples 1 to 6, are indicated in Table IV below.

TABLE IV

| Example | 17 | 18 |
|---|---|---|
| τ | 82 | 88 |
| x | 37 | 16.7 |
| y | 11.8 | 31.5 |
| w | 16.7 | 37 |
| z | 31.7 | 11.8 |
| SC | 48.9 | 49.1 |
| APS | 152 | 142 |
| BV | 2.0 | 1.9 |
| RMC | 45 | 30 |
| MFT | 0 | 0 |
| pH | 8.5 | 8.5 |
| Tg1 | −12 | +38 |
| Tg2 | +26 | −10 |

EXAMPLES 19 and 20

The aqueous polymer (latex) dispersions of Examples 17 and 18 are formulated into matt paint compositions which are strictly identical to those of Examples 7 to 12, and for which the washability W is measured under the conditions already described. The values of W are indicated in Table V below. Example 20 is comparative.

TABLE V

| Example | 19 | 20 |
|---|---|---|
| Aqueous polymer emulsion of Example | 17 | 18 |
| W | 500 | 300 |

I claim:

1. An aqueous dispersion of polymer particles comprising at least one first polymer and at least one second polymer which are mutually incompatible, wherein the first at least one second polymer which are mutually incompatible, wherein the first polymer is non-crosslinked, has a glass transition temperature of from −25° to 0° C. and represents from 40 to 65% by weight of the particles, the second polymer is not alkali-soluble and is non-crosslinked, has a glass transition temperature of from 5° to 40° C. and represents from 60% to 35% by weight of the particles, the glass transition temperature of the second polymer exceeds that of the first polymer by less than 40° C., and the average particle size is between 100 and 300 nm.

2. The aqueous dispersion according to claim 1, wherein the first polymer and the second polymer are prepared from at least one ethylenically unsaturated monomer which is chosen from among the esters of acrylic acid or methacrylic acid and aromatic vinyl monomers.

3. The aqueous dispersion according to claim 2, wherein the first polymer is formed from a mixture of from 15 to 35% by weight of styrene or methyl methacrylate and from 65 to 85% by weight of n-butyl acrylate, and the second polymer is formed from a mixture of from 40 to 70% by weight of styrene or methyl methacrylate and from 30 to 60% by weight of n-butyl acrylate.

4. The aqueous dispersion according to claim 2 wherein the first polymer or the second polymer additionally comprises up to 2 parts by weight of at least one water-soluble comonomer which is copolymerizable with the ethylenically unsaturated monomers, per 100 parts by weight of the said monomer.

5. The aqueous dispersion according to claim 4, wherein said water-soluble comonomer is chosen from acrylic acid, methacrylic acid, acrylamide and methacrylamide.

6. The aqueous dispersion according to claim 1, wherein the glass transition temperature of the second polymer exceeds that of the first polymer by more than 20° C.

7. The aqueous dispersion according to claim 5, wherein the glass transition temperature of the second polymer exceeds that of the first polymer by more than 20° C.

8. A process for the production of an aqueous dispersion comprising a first step of emulsion polymerization of monomers leading to the formation of a first polymer, followed by a second step of emulsion polymerization of monomers, leading to the formation of a second polymer which is incompatible with the first, wherein:

the monomers used in the first step lead to the formation of a first, non-crosslinked polymer which has a glass transition temperature of from −25° C. to 0°, the monomers used in the second step lead to the formation of a second, non-crosslinked polymer which is not alkali-soluble, having a glass transition temperature which is from 5° C. to 40° C. and exceeds the glass transition temperature of the first polymer by less than 40° C., the quantities of monomers employed in the first step and in the second step are such that the first polymer represents from 40% to 65% by weight of the particles of dispersion, while the second polymer represents from 60% to 35% by weight of the particles of the dispersion, and the emulsion polymerization conditions in the first step and in the second step are such that the average particle size is between 100 and 300 nm.

9. The process according to claim 8, wherein the addition and the polymerization of the monomers in the second step commence when the composition of monomers of the first step is at a degree of conversion of no more than 90%.

10. The process according to claim 8, wherein the polymerization is carried out in the presence of up to 1 part by weight, per 100 parts by weight of the monomers, of at least one chain transfer agent.

11. The process according to claim 8, wherein in the first step seeding is carried out such that from 80 to 98% by weight of the monomers used in the first step are added to a reaction medium which already contains a partially polymerized pre-emulsion of from 2 to 20% by weight of the said monomers, and the average size of the polymer particles present in the said partially polymerized preemulsion does not exceed 95 nanometers.

12. The process according to claim 11, wherein the polymerization time of the flux of partial preemulsion does not exceed 45 minutes.

13. The process according to claim 8, wherein the dispersion is prepared in the presence of a combination of a nonionic surfactant and an anionic surfactant.

14. The process according to claim 8, wherein after the second step a treatment is carried out by means of a free-radical initiation system having a short half-life in order to attain a residual monomer content which does not exceed 50 ppm.

15. The process according to claim 11, wherein after the second step a treatment is carried out by means of a free-radical initiation system having a short half-life in order to attain a residual monomer content which does not exceed 50 ppm.

16. A paint composition which is free of plasticizer and coalescence agent comprising an aqueous polymer dispersion according to claim 1.

17. A paint composition which is free of plasticizer and coalescence agent comprising an aqueous polymer dispersion according to claim 3.

18. A paint composition which is free of plasticizer and coalescence agent comprising an aqueous polymer dispersion according to claim 7.

19. A paint composition which is free of plasticizer and coalescence agent obtainable by the process according to claim 8.

20. A paint composition which is free of plasticizer and coalescence agent obtainable by the process according to claim 11.

* * * * *

UNITED STATES PATENT AND TRADEMARK OFFICE
CERTIFICATE OF CORRECTION

PATENT NO. : 5,643,993
DATED : July 1, 1997
INVENTOR(S) : Patrick Guerin

It is certified that error appears in the above-identified patent and that said Letters Patent is hereby corrected as shown below:

Column 1, line 42, change "measuredly" to -- measured by--;

Column 2, line 22, change "Matsumoto" to --T. Matsumoto--;

Column 2, line 33, change "alkyI group" to --alkyl group--;

Column 3, line 62, change "it alms" to --it aims--;

Column 5, line 29, change "47, 35" to --47, 35--;

Column 7, line 8, change "2 to 20" to --2 to 20%--;

Column 12, line 5 (Table II, Column 1), change "Aqueous polymer" to --Aqueous polymer emulsion--; and Column 13, line 32, change "of .85˚ " to --of 85˚--.

UNITED STATES PATENT AND TRADEMARK OFFICE
CERTIFICATE OF CORRECTION

PATENT NO. : 5,643,993
DATED : July 1, 1997
INVENTOR(S) : Patrick Guerin

It is certified that error appears in the above-identified patent and that said Letters Patent is hereby corrected as shown below:

In Column 14, lines 12-14, after the expression "wherein the first" delete "at least one second polymer which are mutually incompatible, wherein the first".

Signed and Sealed this

Sixth Day of January, 1998

Attest:

BRUCE LEHMAN

Attesting Officer

Commissioner of Patents and Trademarks